United States Patent
Liu et al.

(10) Patent No.: US 12,362,881 B2
(45) Date of Patent: Jul. 15, 2025

(54) METHOD FOR DETERMINING DC POSITION, TERMINAL DEVICE, AND NETWORK DEVICE

(71) Applicant: VIVO MOBILE COMMUNICATION CO., LTD., Dongguan (CN)

(72) Inventors: Siqi Liu, Dongguan (CN); Zichao Ji, Dongguan (CN); Kai Wu, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 512 days.

(21) Appl. No.: 17/737,990

(22) Filed: May 5, 2022

(65) Prior Publication Data
US 2022/0263628 A1    Aug. 18, 2022

Related U.S. Application Data

(63) Continuation of application No. PCT/CN2020/136619, filed on Dec. 15, 2020.

(30) Foreign Application Priority Data

Dec. 20, 2019    (CN) .......................... 201911329233.5

(51) Int. Cl.
*H04L 5/00*    (2006.01)
(52) U.S. Cl.
CPC .......... *H04L 5/0051* (2013.01); *H04L 5/0042* (2013.01)
(58) Field of Classification Search
None
See application file for complete search history.

(56) References Cited

U.S. PATENT DOCUMENTS

| 2019/0313394 A1* | 10/2019 | Kubota | H04L 5/001 |
| 2019/0357239 A1* | 11/2019 | Moon | H04W 76/27 |
| 2021/0410111 A1* | 12/2021 | Yokomakura | H04L 5/0094 |

FOREIGN PATENT DOCUMENTS

| CN | 106961734 A | 7/2017 |
| CN | 107786244 A | 3/2018 |
| EP | 3209044 A1 | 8/2017 |
| WO | 2016058444 A1 | 4/2016 |
| WO | 2018031236 A1 | 2/2018 |

OTHER PUBLICATIONS

International Search Report issued in corresponding International Application No. PCT/CN2020/136619, mailed Mar. 11, 2021, 4 pages.
Huawei et al, "Handling of DC subcarrier in NR", 3GPP TSG RAN WG1 Meeting #87, R1-1611654, Nov. 18, 2016.
First Office Action issued in related Chinese Application No. 201911329233.5, mailed Jan. 24, 2022, 9 pages.
Second Office Action issued in related Chinese Application No. 201911329233.5, mailed Aug. 19, 2022, 11 pages.
Catt et al, "TP on channel raster for NR V2X Ue", 3GPP TSG RAN WG4 Meeting #93, R4-1916147, Nov. 2019, 2 pages.

* cited by examiner

*Primary Examiner* — Diane L Lo
(74) *Attorney, Agent, or Firm* — IPX PLLC (57) ABSTRACT

A method for determining a direct current (DC) position, a terminal device, and a network device are provided to ensure transmission performance. The method includes obtaining DC information and determining a DC position according to the DC information.

16 Claims, 5 Drawing Sheets

400

S402 — Obtain DC information, where the DC information is used to determine a DC position S404 — Send the DC information in case that a first predetermined condition is satisfied S406 — Skip performing a signal transmission at the DC position, or perform a signal transmission at a low power at the DC position

100

S102

Obtain DC information, where the DC information is used to determine a DC position

Obtain DC information, where the DC information is used to determine a direct current DC position

Obtain DC information, where the DC information is used to determine a DC position, and at least two pieces of DC information obtained for the same resource are the same; and/or, for the same resource, DC positions determined according to the at least two pieces of DC information are the same

S402: Obtain DC information, where the DC information is used to determine a DC position S404: Send the DC information in case that a first predetermined condition is satisfied S406: Skip performing a signal transmission at the DC position, or perform a signal transmission at a low power at the DC position

S502: Obtain DC information, where the DC information is used to determine a DC position S504: Send an offset value in case that a second predetermined condition is satisfied and the DC information includes the offset value S506: Skip performing a signal transmission at the DC position, or perform a signal transmission at a low power at the DC position

Send first direct current DC information of a resource to a corresponding terminal device and/or another network device

Send first DC information of a resource to a corresponding terminal device and/or another network device

S704

Receive DC information when a first predetermined condition is satisfied

Send first DC information of a resource to a corresponding terminal device and/or another network device

S804

Receive an offset value in case that a second predetermined condition is satisfied and the first DC information includes the offset value

METHOD FOR DETERMINING DC POSITION, TERMINAL DEVICE, AND NETWORK DEVICE

CROSS-REFERENCE TO RELATED APPLICATIONS

This application is a continuation of International Application No. PCT/CN2020/136619, filed Dec. 15, 2020, which claims priority to Chinese Patent Application No. 201911329233.5, filed Dec. 20, 2019. The entire contents of each of the above-referenced applications are expressly incorporated herein by reference.

TECHNICAL FIELD

Embodiments of the present disclosure relate to the field of communications technologies, and in particular to a method for determining a DC position, a terminal device, and a network device.

BACKGROUND

For New Radio (NR), the Direct Current (DC) position of User Equipment (UE)'s uplink transmission is very flexible in the radio interface Uu between the UE and the Universal Terrestrial Radio Access Network (UTRAN) measured by the UE, and does not necessarily have to be located in the center of a carrier.

In some scenarios, such as uplink or sidelink (SL, also called a direct link, a directly connected link, or the like), the DC position cannot be determined by the UE, so that the UE cannot perform corresponding processing on the DC position accordingly, which may affect signal reception and decoding and cannot ensure transmission performance.

SUMMARY

Embodiments of the present disclosure are intended to provide a method for determining a DC position, a terminal device, and a network device to determine the DC position, so that transmission performance can be ensured.

According to a first aspect, a method for determining a DC position is provided, where the method is performed by a terminal device and includes: obtaining direct current DC information, where the DC information is used to determine a direct current DC position.

According to a second aspect, a method for determining a DC position is provided, where the method is performed by a network device and includes: sending first direct current DC information to a corresponding terminal device and/or another network device.

According to a third aspect, a terminal device is provided, including: a determining module, configured to obtain direct current DC information, where the DC information is used to determine a direct current DC position.

According to a fourth aspect, a network device is provided, including: a processing module, configured to send first direct current DC information to a corresponding terminal device and/or another network device.

According to a fifth aspect, a terminal device is provided, including: a processor, a memory, and a computer program that is stored in the memory and that can be run on the processor, where when the computer program is executed by the processor, the steps of the method for determining a DC position according to the first aspect are implemented.

According to a sixth aspect, a network device is provided, including: a processor, a memory, and a computer program that is stored in the memory and that can be run on the processor, where when the computer program is executed by the processor, the steps in the method for determining a DC position according to the second aspect are implemented.

According to a seventh aspect, a computer-readable storage medium is provided, where the computer-readable storage medium stores a computer program, and when the computer program is executed by a processor, the steps of the method for determining a DC position according to the first aspect or the second aspect are implemented.

In the embodiments of the present disclosure, by obtaining of the DC information, where the DC information is used to determine the direct current DC position, the DC position can be determined, so that transmission performance can be ensured.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings.

DETAILED DESCRIPTION

To make the objectives, technical solutions, and advantages of this application clearer, the following clearly describes the technical solutions of this application with reference to the specific embodiments of this application and the corresponding accompanying drawings. Apparently, the described embodiments are merely some rather than all of the embodiments of this application. All other embodiments obtained by a person of ordinary skill in the art based on the embodiments of this application without creative efforts shall fall within the protection scope of this application. The term "and/or" in the embodiments of the specification indicates at least one of a former one and a latter one.

It should be understood that the technical solutions of the embodiments of the present disclosure may be applied to various communications systems, such as a Long Term Evolution (LTE) sidelink system or an NR sidelink system.

In the embodiments of the present disclosure, a terminal device may include, but is not limited to a Mobile Station (MS), a mobile terminal, a mobile telephone, User Equipment (UE), a handset, portable equipment, a vehicle, and the like. The terminal device may communicate with one or more core networks by using a Radio Access Network (RAN). For example, the terminal device may be a mobile telephone (or referred to as a "cellular" telephone), or a computer having a wireless communication function; or the terminal device may be a portable, pocket-sized, handheld, computer built-in, or vehicle-mounted mobile apparatus.

In the embodiments of the present disclosure, a network device is an apparatus that is deployed in a radio access network and that is configured to provide a wireless communication function for the terminal device. The network device may be a base station, and the base station may include various types of macro base stations, micro base stations, relay stations, or access points. In systems that use different radio access technologies, devices that have a base station function may have different names. For example, an evolved NodeB (eNB, or eNodeB) in an LTE network is called a Node B (NodeB) or a NR NodeB (gNB) in a 3rd Generation (3G) network, or a network device in a subsequent evolved communications system, or the like, but the use of the words does not constitute a restriction.

At present, a sidelink supports the following scenarios.

1. An NR base station (base station belonging to NR) controls an NR sidelink: in this scenario, an NR SL resource may be configured for an NR sidelink terminal by the NR base station.

2. An LTE base station (base station belonging to LTE) controls the NR sidelink: in this scenario, an NR SL resource may be configured for an NR sidelink terminal by the LTE base station.

3. The NR base station controls an LTE sidelink: in this scenario, an LTE SL resource may be configured for an LTE sidelink terminal by the NR base station.

4. The LTE base station controls the LTE sidelink: in this scenario, an LTE SL resource may be configured for the LTE sidelink terminal by the LTE station.

That the NR sidelink is controlled by the NR base station and that the LTE sidelink is controlled by the LTE base station belong to intra-Radio Access Technology (intra-RAT) scheduling, while that the NR sidelink is controlled by the LTE base station and that the LTE sidelink is controlled by the NR base station belong to inter-RAT scheduling. This disclosure can be applied to inter-RAT) and intra-RAT scheduling. That is, at least one of DC information of the NR sidelink provided by the gNB, DC information of the NR sidelink provided by the gNB, DC information of the LTE sidelink provided by the gNB, or DC information of the LTE sidelink provided by the eNB are included.

Figure 1:
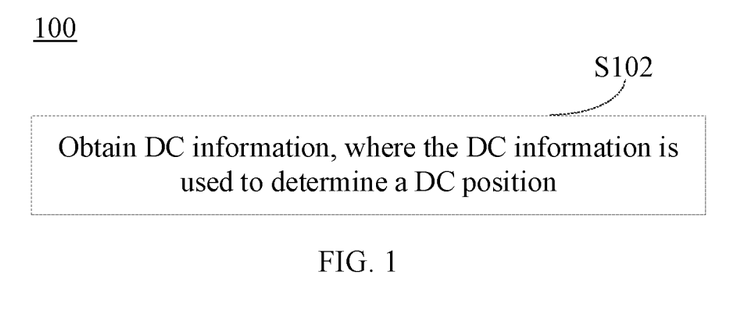
FIG. 1 is a schematic flow chart of an embodiment for determining a DC position according to the present disclosure.

As shown in FIG. 1, an embodiment of the present disclosure provides a method 100 for determining a DC position. The method can be performed by a terminal device 10. In other words, the method can be performed by software or hardware installed in the terminal device 10, and includes the following step.

S102: Obtain direct current (DC) information, where the DC information is used to determine a DC position.

Transmission of a signal at the DC position may cause serious leakage or great interference. If the terminal device 10 cannot determine the DC position, it will be unable to know which position will bring strong interference, and it will not be able to perform corresponding processing, which will lead to degradation or even an error to signal transmission performance, where signal transmission includes signal transmission or reception.

In an implementation, the DC information may be obtained in at least one of the following obtaining manners, and the DC position can be determined accordingly. The obtaining manners include: indication from a network device 30 or another terminal device 20, specifically, the network device 30, such as a base station, or the another terminal device 20 configures the DC information for the terminal device 10 and indicates the information to the terminal device 10; pre-configuration in the terminal device; and definition of a preset rule. In an implementation, the definition of the preset rule may be a provision or definition of a communications protocol.

In some scenarios, the base station can inform a UE of a downlink DC position through Radio Resource Control (RRC) signaling, so as to help the UE determine the downlink DC position, thus helping the UE receive and decode a downlink signal. A connected UE may also report its uplink DC position to the base station through RRC signaling to help the base station determine the DC position of the UE, thereby receiving and decoding an uplink signal. However, in an implementation, in NR SL, because both a sender and a receiver are UE, and there is not necessarily RRC connection between the UE, a DC position of a sidelink cannot be determined by sidelink RRC, thus transmission performance cannot be ensured, and a transmission error may be caused.

In this case, the DC information may be obtained in at least one of the foregoing obtaining manners, so that the DC position can be determined, thus the transmission performance can be ensured and a transmission error can be prevented in a subsequent transmission step.

For example, the terminal device 10 and another terminal device 20 are sidelink UE, the terminal device 10 is the sender and another terminal device 20 is the receiver. In this step, the terminal device 10 obtains its DC information to determine a DC position of the terminal device 10, and sends a signal according to its DC position.

The terminal 20 may also obtain the DC information of the terminal device 10 in at least one of the foregoing obtaining manners in this step, so as to determine the DC position of the terminal device 10 and receive the signal according to the DC position of the terminal device 10.

In some embodiments, the network device 30 may indicate the DC position of the terminal device 10 to the terminal device 20. In some embodiments, the terminal device 10 or another terminal device other than the terminal device 10 and terminal device 20 may indicate the DC position of the terminal device 10 to the terminal device 20. In some embodiments, the DC position of the terminal device 10 may be pre-configured in the terminal device 20. In some embodiments, the DC position of the terminal device 10 may be obtained through the definition of the preset rule. The definition of the preset rule may be a provision or definition of the communications protocol.

On the contrary, the terminal device 10 may be the receiver and another terminal 20 may be the sender, and a corresponding implementation method is similar and will not be described again.

In another implementation, when an idle UE performs Uplink (UL) transmission (for example, msg3 transmission), because RRC connection has not been established with the base station, DC information of the terminal device cannot be reported to the base station through RRC signaling, thus the transmission performance cannot be ensured. In this case, the DC information may also be obtained in at least one of the foregoing obtaining manners, so that the DC position can be determined, thus the transmission performance can be ensured in a subsequent transmission step.

For example, the terminal device 10 is a sidelink UE, and the terminal device 10 can simultaneously perform UL transmission with a target base station. In this case, the terminal device 10 is the sender and the target base station is the receiver.

In this step, the terminal device 10 obtains its DC information to determine a DC position of the terminal device 10, and sends a signal according to its DC position.

The target base station can also obtain the DC information of the terminal device 10 in at least one of the foregoing obtaining manners in this step, so as to determine the DC position of the terminal device 10 and receive the signal according to the DC position of the terminal device 10.

In some embodiments, the network device 30 may indicate the DC position of the terminal device 10 to the target base station. In some embodiments, the terminal device 10 or another terminal device other than the terminal device 10 may indicate the DC position of the terminal device 10 to the target base station. In some embodiments, the DC position of the terminal device 10 may be pre-configured in the target base station. In some embodiments, the DC position of the terminal device 10 may be obtained through a definition of a preset rule. In an implementation, the definition of the preset rule may be a provision or definition of a communications protocol.

When a sidelink service is performed in a licensed band, the base station usually reallocates a part of uplink resources to a sidelink, that is, the sidelink reuses a UL resource. A configuration is to configure UL BWP and SL BWP by Time division multiplexing (TDM). Frequency domain resources of the UL BWP and SL BWP at least partially overlap, and the terminal device 10 may perform SL or UL transmission at different times respectively.

In a possible implementation, the terminal device 10 keeps positions of UL DC and SL DC the same, so that frequently adjusting Radio Frequency (RF) or interference can be prevented during each switching from SL transmission to UL transmission or from the UL transmission to the SL transmission.

Therefore, according to this embodiment of the present disclosure, the direct current DC position can be determined according to the direct current DC information. The DC information is obtained in at least one of the following obtaining manners, including: the indication from the network device or another terminal device, the pre-configuration in the terminal device, or the definition of the preset rule, so that the DC position can be determined to ensure the transmission performance.

Figure 2:
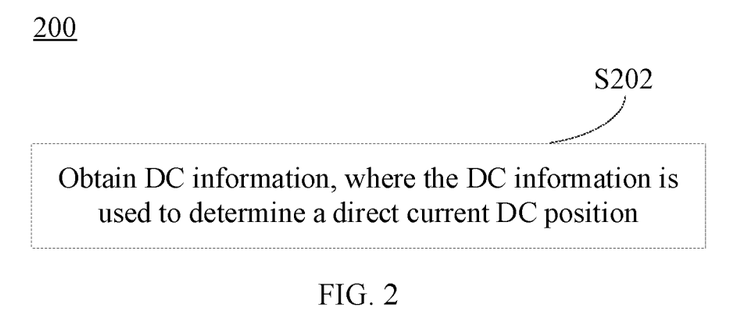
FIG. 2 is a schematic flow chart of another embodiment for determining a DC position according to the present disclosure.

As shown in FIG. 2, another embodiment of the present disclosure provides a method 200 for determining a DC position. The method can be performed by a terminal device. In other words, the method can be performed by software or hardware installed in the terminal device and includes the following step.

S202: Obtain DC information, where the DC information is used to determine a DC position.

In an implementation, the DC information may include: at least one of position information and an offset value. The position information is used to indicate a reference position, and the offset value is an offset value relative to the reference position.

This step can be performed in a manner similar to step S102 in the embodiment of FIG. 1, and will not be described herein again.

In a first implementation, the DC information may be position information. The position information is used to indicate the reference position. In this step, the terminal device may determine the reference position as the DC position. The DC mentioned in the present disclosure may be either transmit (TX) DC or receive (RX) DC, which is not limited in this embodiment of the present disclosure. A case in which the DC position is the reference position may be understood as a case in which the offset value relative to the reference position is 0.

The reference position may include: at least one of a position of a Synchronization Signal and PBCH Block (SSB), a position of a Sidelink-Synchronization Signal and PBCH Block (S-SSB), a preset point A in a sidelink, a preset point A in a Uu link, uplink DC, downlink DC, sidelink DC, a reference carrier position, a reference bwp position, a reference resource pool position, a reference sub-carrier position, a reference sub-channel position, a reference resource grid position, or a reference resource block position.

For example, the DC information may be the preset point A in the sidelink, for example, SL DC is aligned with the point A. The DC information may be UL DC. Further, in some embodiments, the UL DC is DC of the UL BWP associated with the SL BWP. For example, SL DC configured or pre-configured by the based station, or defined in a specification is aligned with the UL DC. Further, for example, DC of the SL BWP configured or pre-configured by the base station, or defined in a specification is aligned with UL DC of the UL BWP associated with the SL BWP. Alternatively, the UL DC is DC of an UL carrier associated with an SL carrier (or the SL BWP). For example, DC of the SL carrier (or the SL BWP) configured or pre-configured by the base station or defined in a specification is aligned with the UL DC. Further, for example, the DC of the SL carrier (or the SL BWP) configured or pre-configured by the base station or defined in a specification is aligned with the UL DC of ab UL carrier associated with the SL carrier (or the SL BWP). The DC information may be DL DC. Further, in some embodiments, the DL DC is DC of a DL BWP with the same ID as the UL BWP associated with the SL BWP. For example, the SL DC configured or pre-configured by the base station or defined in a specification is aligned with the DL DC. Further, for example, assuming that the SL BWP is associated with UL BWP #1, the SL DC of the SL BWP configured or pre-configured by the base station or defined in a specification is aligned with DL DC of the DL BWP with the same ID as the UL BWP associated with the SL BWP, that is, aligned with DL DC of DL BWP #1, where #1 represents BWP ID=1, so that a SL DC position can be determined. Alternatively, the DL DC is DC of a DL carrier corresponding to an UL carrier associated with the SL carrier (or the SL BWP). For example, the SL DC configured or pre-configured by the base station or defined in a specification is aligned with the DL DC. Further, for example, the SL DC of the SL carrier (or the SL BWP) configured or pre-configured by the base station or defined in a specification is aligned with DC of a DL carrier with the same ID as the UL carrier associated with the SL carrier (or the SL BWP), so that an SL DC position can be determined.

The DC information may be the SL DC. Further, in some embodiments, the SL DC is DC of the SL BWP associated with the UL BWP. For example, UL DC configured or pre-configured by the base station or defined in a specification is aligned with the SL DC. Further, for example, the DC of the UL BWP configured or pre-configured by the base station or defined in a specification is aligned with the SL DC of the SL BWP associated with the UL BWP. Alternatively, the SL DC is DC of the SL carrier associated with the UL BWP. For example, the DC of the UL BWP configured or pre-configured by the base station or defined in a specification is aligned with the SL DC of the SL carrier associated with the UL BWP, so that a position of the UL DC can be determined.

A definition of whether the BWP or the carrier is associated is as follows: at least one of same subcarrier spacing (SCS), complete or partial overlapping of frequency domain ranges, same IDs, or the like.

In a second implementation, the DC information may be the position information and offset value. The position information is used to indicate the reference position, and the offset value is the offset value relative to the reference position. In this step, a position obtained by shifting according to the offset value based on the reference position is determined as the DC position.

For example, for NR Vehicle to Everything (V2X) UE, the accuracy of a channel grid depends on SCS supported by a frequency band (that is, an interval between two adjacent frequency domain positions in the channel grid may be 15, 30, 60, or 120 kHz), and a RF reference frequency may be shifted according to the following formula:

$$FREF\_V2X = FREF + \Delta shift + N*5 \text{ kHz}$$

$\Delta shift=0$ kHz or 7.5 kHz (indicated by frequency Shift7p5khz), N={-1, 0, 1}. The UE may obtain $\Delta shift$ and N in at least one of the manners: specification definition, network configuration, or pre-configuration. If $\Delta shift$ and N are obtained through the specification definition, configuration, or pre-configuration, and one reference sub-carrier is defined in a specification, configured in a network, or pre-configured as a DC sub-carrier, an actual position of the DC sub-carrier has an offset $N*\Delta F+\Delta shift$ from a position of the defined or configured, or pre-configured sub-carrier.

In addition, a position after shifting based the offset may also be indicated, and an offset value relative to the reference position may be represented by a number of a sub-carrier through the specification definition, network configuration, or pre-configuration. For example, a parameter A in the DC information indicates a DC sub-carrier through the specification definition, network configuration, or pre-configuration. When a value of the parameter A is in the interval [b, c], it indicates a number of a current DC sub-carrier, and the DC position is a position of the indicated sub-carrier. Alternatively, when the value of A is d, it indicates that an offset exists, and an actual position of the DC sub-carrier=a position of a reference sub-carrier ref+offset. The reference sub-carrier ref and the offset may be jointly indicated by d. For example, the parameter A=1101 indicates that the offset is $N=1*\Delta F$ based on the reference sub-carrier ref=1650.

Alternatively, when the value of A is e, it indicates a position shifted based on a position of the reference sub-carrier ref.

In a third implementation, the DC information may be an offset value relative to the reference position, and the reference position is obtained by the terminal device in another manner. For example, an offset value relative to the reference position configured by the base station is a reference position of the terminal device defined in a specification. For example, the reference sub-carrier ref and the offset may also be determined separately. For example, the parameter A=1102 in DC information configured by the base station indicates that N=1 $\Delta F$ is shifted based on the reference sub-carrier ref, and the reference sub-carrier ref is defined in a specification or obtained in another manner, for example, a number of the reference sub-carrier ref is defined as 1650 in a specification. Similarly, in this step, a position obtained by shifting according to the offset value based on the reference position is determined as the DC position.

In another implementation, the DC information is used to represent that the DC position is in at least one of a center, a start point, an end point, or outside of a range of a resource.

The resource may include at least one of a carrier, a Bandwidth Part (bwp), a resource pool, a sub-carrier, a sub-channel, a resource grid, or a RB. The carrier, bwp, sub-carrier, resource grid, or RB may be at least one of a carrier, bwp, sub-carrier, resource grid, or RB of DL, UL, and SL.

A resource position may include at least one of a carrier position, a bwp position, a resource pool position, a sub-carrier position, a sub-channel position, a resource grid position, or an RB position. At least two resource positions are used as a limit to define a range of a resource, such as at least one of a carrier range, a bwp range, a resource pool range, a sub-carrier range, a sub-channel range, an RB range, or a resource grid.

The start point of the range of a resource may be one of a first RB, a first sub-carrier, an RB with index=0, a lowest frequency position, or the like within the range of a resource. The end point of the range of a resource may be one of the last RB, the last sub-carrier, an RB with the largest number, the highest frequency position, or the like in the range of a resource.

The center of the range of a resource may be: a sub-carrier with a middle number among numbers, an RB with a middle number among numbers, a center frequency position, or the like. For example, if the frequency domain range includes 2N RBs, the center of the range of a resource may be a first sub-carrier (for example, sub-carrier 0) of an $N+1^{th}$ ARB or the last sub-carrier (for example, sub-carrier 11) of an $n^{th}$ RB. If the frequency domain position includes 2N+1 RBs, the center is a $6^{th}$ sub-carrier (for example, sub-carrier 5) of an $N+1^{th}$ RB or a $7^{th}$ sub-carrier (for example, sub-carrier 6) of the $N+1^{th}$ RB.

In some embodiments, at least one of the center, start point, end point, or outside of the range of a resource of the DC position may be represented by a preset value. For example, taking SL DC as an example, the DC information may include a certain first specific value, which indicates that the SL DC position is at a center of a reference carrier. For example, the DC information may include a second specific value, which indicates that the SL DC position is outside the reference carrier. For example, the DC information may include a third specific value, which indicates that the SL DC position is outside a reference SL BWP. In some embodiments, it can also be assumed that the DC position is at least one of the center, start point, end point, or outside of the range of a resource.

In some embodiments, the DC information may also carry a specific DC position and/or an offset from a certain reference point in case of the outside of the range of a resource.

In a first implementation, the DC information may include at least one of the center, start point, end point, or outside of the range of a resource that represents the DC position, and the range of a resource is obtained by the terminal device in another manner.

In a second implementation, the DC information may include: a range of a resource and a representative value that can represent that the DC position is in at least one of the center, start point, end point, or outside of the range of a resource.

In one case, the foregoing offset value may be an offset relative to at least one of the center, start point, end point, or outside of the range of a resource. Specifically, the foregoing offset is an offset from a center, a start point, or an end point of at least one of a reference carrier, a reference bwp, a reference resource pool, a reference sub-carrier, a reference sub-channel, a reference resource grid, or a reference RB.

For example, a DC sub-carrier position is a position shifted by N=1 $\Delta F$ relative to a center of an indicated reference sub-carrier position, that is, a corresponding position shifted by $\Delta F$ relative to the center of the indicated reference sub-carrier position (DC subcarrier location is offset by $\Delta F$ kHz relative to the center of the indicated subcarrier). In another case, the foregoing offset is an offset relative to a certain reference point other than at least one of the reference carrier, reference bwp, reference resource pool, reference sub-carrier, reference sub-channel, reference resource grid, or reference RB.

In still another implementation, the DC information may be used to indicate that the DC position is undetermined. For example, the DC information may include a fourth specific value, which is used to indicate that the SL DC position is undetermined, or the like.

Therefore, the method for determining a DC position according to this embodiment of the present disclosure can accurately determine the DC position, thereby preventing a signal transmission error and ensuring transmission performance. In addition, in case that the DC position is undetermined, the terminal device can be notified in time, so that the terminal device can perform targeted processing based on indetermination of the DC position.

Figure 3:
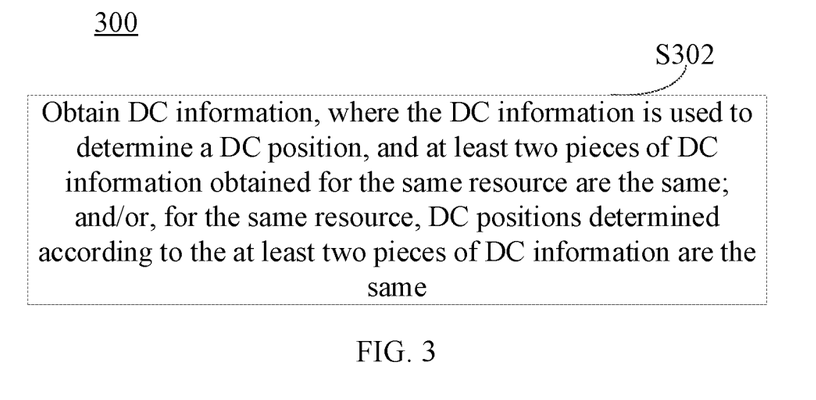
FIG. 3 is a schematic flow chart of still another embodiment for determining a DC position according to the present disclosure.

As shown in FIG. 3, still another embodiment of the present disclosure provides a method 300 for determining a DC position. The method can be performed by a terminal device. In other words, the method can be performed by software or hardware installed in the terminal device, and includes the following step.

S302: Obtain direct current DC information, where the DC information is used to determine a direct current DC position, and at least two pieces of DC information obtained for the same resource are the same; and/or, for the same resource, DC positions determined according to the at least two pieces of DC information are the same.

This step may be similar to step S102 and step S202 in the embodiments of FIG. 1 and FIG. 2, and will not be described herein again.

In this step, the at least two pieces of DC information obtained for the same resource may be the same.

In an implementation, the resource may include at least one of the following: a carrier, bwp, a resource pool, a sub-carrier, a sub-channel, a resource grid, or an RB. The carrier, bwp, sub-carrier, resource grid, or RB may be at least one of a carrier, a bwp, a sub-carrier, a resource grid, or a RB of DL, UL, or SL.

In an implementation, for the same resource, the terminal device may obtain DC information of the terminal device in various obtaining manners. For example, first DC information may be obtained through an indication from a network device, second DC information may be obtained through an indication from another terminal device, third DC information may be obtained through pre-configuration configured in the terminal device, and fourth DC information may be obtained through a definition of a preset rule, such as a provision of a communications protocol.

For the same resource, the UE is not expected to be provided with a plurality of different pieces of DC information. For example, the UE is not expected that the first DC information obtained through the indication from the network device is different from the second DC information obtained through the indication from another terminal device.

Alternatively, for the same resource, it is assumed by the UE (UE assume) that a plurality of different pieces of provided DC information, for example, it is assumed by the UE that the first DC information obtained through the indication from the network device is the same as the second DC information obtained through the indication from another terminal device.

For the same resource, at least two pieces of DC information obtained in different manners are the same, which can be implemented in the following ways: the foregoing first DC information to the fourth DC information are all the same, or at least two pieces of DC information from the first DC information to the fourth DC information are the same, for example, the first DC information is the same as the second DC information. In addition, for the same resource, DC positions determined according to at least two pieces of the DC information are the same. In an implementation, because the at least two pieces of DC information are the same, the DC positions determined according to the at least two pieces of DC information are the same accordingly. In addition, for the same resource, at least two pieces of DC information obtained in the same way are also the same.

In some embodiments, the DC information may include at least one of position information and an offset value. The position information is used to indicate a reference position, and the offset value is an offset value relative to the reference position, and may also be used to represent that the DC position is in at least one of a center, a start point, an end point, or outside of a range of a resource.

The same DC information may be understood as follows: if the first DC information to the fourth DC information are the same, and the first DC information includes position information indicating a first reference position, the second DC information to the fourth DC information also include position information indicating the first reference position. Alternatively, if at least two pieces of the first DC information to the fourth DC information are the same, and the first DC information includes position information indicating a second reference position, at least one of the second DC information, third DC information, or the fourth DC information, for example, the second DC information, also includes position information indicating the second reference position, that is, the first DC information is at least the same as the second DC information. In addition, because at least two pieces of DC information are the same, DC positions determined according to the at least two pieces of same DC information are also the same.

In another implementation, the DC information may be the same or different, but for the same resource, DC positions determined according to the at least two pieces DC information are the same.

In some scenarios, for the same resource, DC information obtained in different obtaining manners may be the same or different. For example, the first DC information obtained by the indication from the network device may be position information, the second DC information obtained by the indication from the another terminal device may be an offset value relative to a reference position, third DC information obtained by pre-configuration configured in the terminal device may be the position information and the offset value, and the fourth DC information obtained by the provision in the communications protocol may represent that the DC position is in at least one of the center, start point, or end point of the range of a resource. However, regardless of the same or different DC information, for the same resource, DC positions determined according to at least two pieces of the DC information are the same.

Alternatively, for the same resource, the UE is not expected that DC positions corresponding to a plurality of pieces of provided DC information are different. For example, the UE is not expected that a DC position corresponding to the first DC information obtained through the indication from the network device is different from a DC position corresponding to the second DC information obtained through the indication from another terminal device.

Alternatively, for the same resource, it is assumed by the UE (UE assume) that DC positions corresponding to a plurality of different pieces of provided DC information are the same, for example, it is assumed by the UE that a DC position corresponding to the first DC information obtained through the indication from the network device is the same as a DC position corresponding to the second DC information obtained through the indication from the another terminal device.

In another implementation, a plurality of terminal devices may have the same DC position, for example, a terminal device 10 and another terminal device 20 may have the same DC position, so that a DC position of another terminal device can be determined while the terminal device determines its own DC position.

Therefore, through the method for determining a DC position according to this embodiment of the present disclosure, the DC position can be determined accurately, and it can be ensured that DC positions determined according to the DC information are the same, thereby preventing a signal transmission error and ensuring transmission performance.

Figure 4:
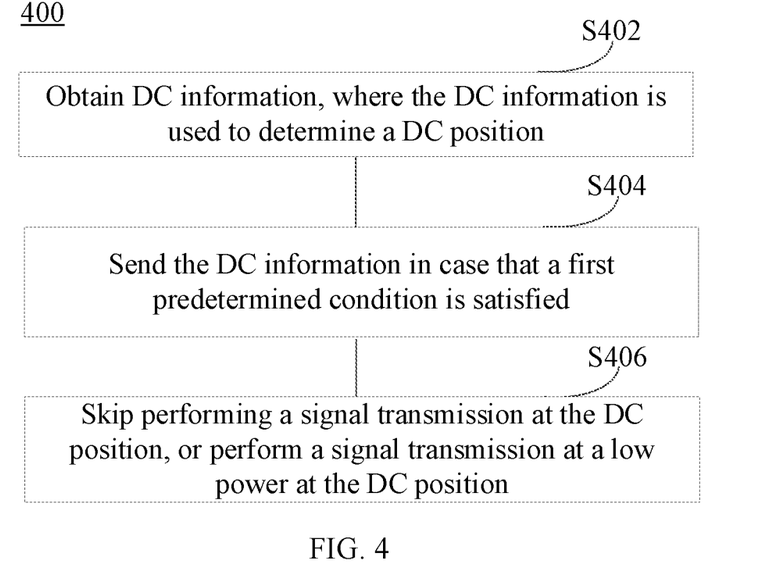
FIG. 4 is a schematic flow chart of yet another embodiment for determining a DC position according to the present disclosure.

As shown in FIG. 4, yet another embodiment of the present disclosure provides a method 400 for determining a DC position. The method can be performed by a terminal device 10. In other words, the method can be performed by software or hardware installed in the terminal device 10, and includes the following step.

S402: Obtain direct current DC information, where the DC information is used to determine a direct current DC position.

The DC information is obtained in at least one of the following obtaining manners, including: an indication from a network device 30 or another terminal device 20, pre-configuration in the terminal device 10, or a definition of a preset rule. In an implementation, the definition of the preset rule may be a provision or definition of a communications protocol. This step may be similar to step S102, step S202, and step S302 in the embodiments of FIG. 1 to FIG. 3, respectively, and will not be described herein again.

In some scenarios, the base station can inform a UE of a downlink DC position through Radio Resource Control (RRC) signaling, so as to help the UE determine the downlink DC position, thus helping the UE receive and decode a downlink signal. A connected UE may also report its uplink DC position to the base station through RRC signaling to help the base station determine the DC position of the UE, thereby receiving and decoding an uplink signal.

However, in an implementation, in NR SL, because both a sender and a receiver are UE, and there is not necessarily an RRC connection between the UE, a DC position of a sidelink cannot be determined by sidelink RRC, thus transmission performance cannot be ensured and a transmission error may be caused. In this case, the DC position may be determined in this step, so that, in a subsequent transmission step, transmission performance can be ensured and a transmission error can be prevented.

In another implementation, when an idle UE performs Uplink (UL) transmission (for example, msg3 transmission), because RRC connection has not been established with the base station, DC information of the terminal device cannot be reported to the base station through RRC signaling, thus the transmission performance cannot be ensured. In this case, the DC position may be determined in this step, so that transmission performance can be ensured in a subsequent transmission step.

S404: Send the DC information in case that a first predetermined condition is satisfied.

The first predetermined condition includes at least one of the following:

a request to report the DC position is obtained, specifically, in an implementation, UE may be required to report SL DC as defined in a specification, or as pre-configured, or by another UE or a base station. For example, the UE reports the SL DC as defined in a specification, and in this case, the UE reports the SL DC to the base station and/or another UE, for example, pre-configuration includes reportSidelinkTx-DirectCurrent, and in this case, the UE reports the SL DC to the base station and/or another UE, for example, the another UE sends the reportSidelinkTxDirectCurrent to the UE, and in this case, the UE reports the SL DC, and for example, the RRCReconfiguration, RRCResume, or RRCSetup configuration sent by the base station includes reportSidelinkTxDirectCurrent, and in this case, the UE reports the SL DC; in another implementation, the base station may require the UE to report UL DC, for example, the RRCReconfiguration, RRCResume, or RRCSetup configuration sent by the base station includes reportUplinkTxDirectCurrent, and in this case, the UE may report the UL DC and SL DC, and the UE may also report the UL DC or SL DC; another UE or base station required to report the DC position may be the network device 30 or the another terminal device 20, or another UE or base station other than the network device 30 or the another terminal device 20.

Resource reconfiguration occurs, which may include: at least one of SL carrier reconfiguration, SL bwp reconfiguration, SL resource pool reconfiguration, UL carrier reconfiguration, UL bwp reconfiguration, DL carrier reconfiguration, or DL bwp reconfiguration;

bwp switching occurs, which may include: at least one of DL BWP handover, UL BWP handover, or SL BWP handover;

resource pool switching occurs;

a beam failure;

a radio link failure;

beam failure recovery; or radio link failure recovery.

The DC information sent in this step may be applied to the following situations.

In one case, a DC position determined according to the DC information sent in this step is the same as the DC position determined according to the DC information obtained in step S402. However, content included in the DC information itself may be the same or different. For example, the DC information sent in this step may be position information, while the DC information obtained in step S402 may be an offset value or the like, that is, forms of the DC information may be different, but determined DC positions are the same.

In another case, before step S402, previous DC information may also be obtained in the foregoing obtaining manner, but a previous DC position determined according to the previous DC information is improper for some reasons. In this case, the terminal device 10 can obtain actual DC information through step S402, and the actual DC information is sent in this step. Similarly, the DC position determined according to the DC information sent in this step is the same as the DC position determined according to the actual DC information obtained in step S402, but included content may be the same or different. Certainly, the step for obtaining the previous DC information is not necessary. In an implementation, the terminal device 10 can directly obtain the actual DC information through step S402 and send it in this step.

In an implementation, the DC information sent to another terminal device and/or network device includes: at least one of an SSB position, an S-SSB position, a preset point in a sidelink, a preset point in Uu link, uplink DC, downlink DC, sidelink DC, a reference carrier position, a reference bwp position, a reference resource pool position, a reference sub-carrier position, a reference sub-channel position, a reference resource grid, or a reference resource block position.

Specifically, the DC information may be a resource frequency domain position, and may also be a resource number, such as at least one of a reference carrier number, a reference bwp number, a reference resource pool number, a reference sub-carrier number, a reference sub-channel number, a reference resource grid number, a reference resource block number, a preset point number, or a frequency number.

The resource number may further be NR-ARFCN (NR absolute radio frequency channel number), E-ARFCN (E-UTRA absolute radio frequency channel number), or another preset frequency domain position number.

In an implementation, the UE may inform the base station of the DC information through RRC signaling. Specifically, the base station may be informed of the DC information through at least one of UECapabilityInformation, UEAssistanceInformation, sidelinkUEinformation, RRCReconfigurationComplete, RRCReestablishmentComplete, RRCResumeComplete, or another piece of RRC signaling. For example, the UE reports the SL DC information to the base station through the RRCReconfigurationComplete.

In another implementation, the UE may inform another UE of the DC information through a resource such as at least one of a Physical Sidelink Broadcast Channel (PSBCH), a reference signal (RS), a sequence, a Physical Sidelink Feedback Channel (PSFCH), L2 signaling, a Physical Sidelink Shared Channel (PSCCH), RRC.

An implicit indication method is that different synchronization resources correspond to different DC positions. When a synchronization resource used for receiving or sending a S-SSB is determined by the UE, a corresponding DC position is determined. Different synchronization resources usually correspond to different time domain positions and offsets, where the offset may be an interval between a time domain position of a first S-SSB and a start point of a S-SSB period. For example, different synchronization resources correspond to different timeOffsetSSB-SLs.

S406: Skip performing a signal transmission at the DC position, or perform a signal transmission at a low power at the DC position.

In an implementation, the terminal device 10 and the another terminal device 20 are sidelink UE, and the terminal device 10 is a sender and the another terminal device 20 is a receiver. In some embodiments, the terminal device 10 and the another terminal device 20 may have the same DC position. Because signal transmission at the SL DC position will cause great interference, in this case, the terminal device 10 can perform corresponding processing after the SL DC position is determined.

In a possible implementation, the terminal device 10 may not transmit a signal at the SL DC position. Specifically, the terminal device 10 may not map a signal to the SL DC, or may set SL transmission power on the SL DC to 0 or a SL signal mapped to the SL DC to 0. In another possible implementation, the terminal device 10 may set the SL transmission power on the SL DC to be lower than a predetermined power threshold.

The another terminal device 20 may determine a SL DC position of the sender according to the DC information. Afterwards, it can be assumed that the sender does not map a SL signal to the SL DC, or sets the SL transmission power to 0 or a mapped SL signal to 0, or the SL transmission power to be lower than the predetermined power threshold. Therefore, the DC position will not cause strong interference to another position, so that the receiver can decode a received signal normally. Further, in some embodiments, the receiver may further take the SL DC position out of received buffer before decoding, and only decode the remaining buffer.

Similarly, at a certain time point, the terminal device 10 may be the receiver, while the another terminal device 20 may be the sender. In this case, operations of the sender and the receiver are similar to those described above, and will not be described herein again.

Therefore, the method for determining a DC position according to this embodiment of the present disclosure can enable the sender and the receiver to accurately determine the DC position in a signal transmission process of a sidelink, so that no signal is transmitted at a DC position with large interference, thereby preventing a signal transmission error and ensuring transmission performance.

In an implementation, the terminal device 10 is a sidelink UE, and the terminal device 10 can simultaneously perform UL transmission with the base station. In this case, the terminal device 10 is the sender and the base station is the receiver. When a sidelink service is performed in a licensed band, the base station usually reallocates a part of uplink resources to a sidelink, that is, the sidelink reuses an UL resource.

A configuration is to configure UL BWP and SL BWP by Time division multiplexing (TDM). Frequency domain resources of the UL BWP and SL BWP at least partially overlap, and the terminal device 10 may perform SL or UL transmission at different time respectively.

In a possible implementation, the terminal device 10 keeps the same position of UL DC and SL DC, so that frequently adjusting Radio Frequency (RF) or interference can be prevented during each switching from SL transmission to UL transmission or from the UL transmission to the SL transmission. In this case, when uplink transmission is performed, the terminal device 10 may not transmit an UL signal at an UL DC position (that is, also an SL DC position).

Specifically, the terminal device 10 may not map the UL signal to the UL DC, or may set UL transmission power on the UL DC to 0, the UL signal mapped to the UL DC to 0, or the UL transmission power to 0 or to be lower than a predetermined value.

In another possible implementation, the terminal device 10 may not transmit the SL signal at the SL DC position (that is, also the UL DC position). Specifically, the terminal device 10 may not map the SL signal to the SL DC, or may set the SL transmission power on the SL DC to 0, the SL signal mapped to the SL DC to 0, or the SL transmission power to 0 or to be lower than a predetermined value. Therefore, frequent RF adjustments can be prevented, and possible interference between the SL and UL can be reduced.

Figure 5:
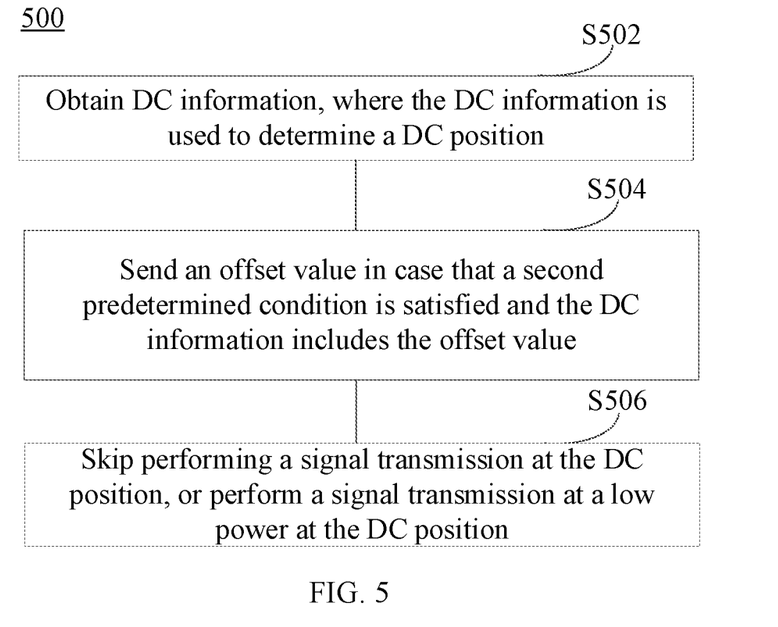
FIG. 5 is a schematic flow chart of still yet another embodiment for determining a DC position according to the present disclosure.

As shown in FIG. 5, a still yet another embodiment of the present disclosure provides a method 500 for determining a DC position. The method can be performed by a terminal device. In other words, the method can be performed by software or hardware installed in the terminal device, and includes the following step.

S502: Obtain DC information, where the DC information is used to determine a DC position.

In this embodiment, the DC information includes an offset value relative to a reference position. This step may be similar to the case that the DC information includes the offset value relative to the reference position in the embodiment of FIG. 2, and will not be described herein again.

S504: Send the offset value when a second predetermined condition is satisfied and the DC information includes the offset value.

Another UE or base station in this step may be a network device 30 or another terminal device 20, or another UE or base station other than the network device 30 or the another terminal device 20.

The second predetermined condition includes at least one of the following:
- a request for reporting the DC position is obtained, where this condition is similar to the request for reporting the DC position obtained in the first predetermined condition, and will not be described herein again;
- a request to report an offset is obtained, for example, the UE reports the offset as defined in a specification, and in this case, the UE reports the offset to the base station and/or another UE, for example, pre-configuration includes or enables the request for reporting the offset, and in this case, the UE reports the offset to the base station and/or another UE, and for example, a request to report the offset is received from the base station and/or the another UE;
- an offset is configured for a sidelink or an uplink, for example, frequencyShift7p5khz is configured for an UL carrier by the base station or an offset is configured for the SL by the base station;
- resource reconfiguration occurs, which may include: at least one of SL carrier reconfiguration, SL bwp reconfiguration, SL resource pool reconfiguration, UL carrier reconfiguration, UL bwp reconfiguration, DL carrier reconfiguration, or DL bwp reconfiguration;
- bwp switching occurs;
- resource pool switching occurs;
- a beam failure;
- a radio link failure;
- beam failure recovery; or
- radio link failure recovery.

The offset value may be an offset of the DC position relative to a certain reference point, such as an offset relative to at least one of an SSB position, an S-SSB position, a preset point in a sidelink, a preset point in a Uu link, uplink DC, downlink DC, sidelink DC, a reference carrier position, a reference bwp position, a reference resource pool position, a reference sub-carrier position, a reference sub-channel position, a reference resource grid position, or a reference resource block position.

In an implementation, the UE may inform the base station of the offset value through RRC signaling. Specifically, the base station may be informed of the DC information through at least one of UECapabilityInformation, UEAssistanceInformation, sidelinkUEinformation, RRCReconfigurationComplete, RRCReestablishmentComplete, RRCResumeComplete, or another piece of RRC signaling. For example, the UE reports the SL DC information to the base station through the RRCReconfigurationComplete.

In another implementation, the UE may inform another UE of the DC information through a resource such as at least one of a Physical Sidelink Broadcast Channel (PSBCH), a reference signal (RS), a sequence, a Physical Sidelink Feedback Channel, (PSFCH), L2 signaling, a Physical Sidelink Shared Channel (PSCCH), RRC.

S506: Skip performing a signal transmission at the DC position, or perform a signal transmission at a low power at the DC position. In an implementation, the terminal device 10 and the another terminal device 20 are sidelink UE, and the terminal device 10 is a sender and the another terminal device 20 is a receiver. Because signal transmission at the SL DC position will cause great interference, in this case, the terminal device 10 can perform corresponding processing after the SL DC position is determined.

In a possible implementation, the terminal device 10 may not transmit a signal at the SL DC position. Specifically, the terminal device 10 may not map a signal to the SL DC, or may set an SL transmission power on the SL DC to 0 or an SL signal mapped to the SL DC to 0. In another possible implementation, the terminal device 10 may set the SL transmission power on the SL DC to be lower than a predetermined power threshold.

The another terminal device 20 may determine an SL DC position of the sender according to the DC information. Afterwards, it can be assumed that the sender does not map an SL signal to the SL DC, or sets the SL transmission power to 0 or a mapped SL signal to 0, or the SL transmission power to be lower than the predetermined power threshold. Therefore, the DC position will not cause strong interference to another position, so that the receiver can decode a received signal normally. Further, in some embodiments, the receiver may further take the SL DC position out of received buffer before decoding, and only decode the remaining buffer.

Similarly, at a certain time point, the terminal device 10 may be the receiver, while the another terminal device 20 may be the sender. In this case, operations of the sender and the receiver are similar to those described above, and will not be described herein again.

Therefore, the method for determining a DC position according to this embodiment of the present disclosure can enable the sender and the receiver to accurately determine the DC position in a signal transmission process of a sidelink, so that no signal is transmitted at a DC position with large interference, thereby preventing a signal transmission error and ensuring transmission performance.

In an implementation, the terminal device 10 is a sidelink UE, and the terminal device 10 can simultaneously perform UL transmission with the base station. In this case, the terminal device 10 is the sender and the base station is the receiver. When a sidelink service is performed in a licensed band, the base station usually reallocates a part of uplink resources to a sidelink, that is, the sidelink reuses a UL resource.

A configuration is to configure UL BWP and SL BWP by Time division multiplexing (TDM). Frequency domain resources of the UL BWP and SL BWP at least partially overlap, and the terminal device 10 may perform SL or UL transmission at different time respectively.

In a possible implementation, the terminal device 10 keeps positions of UL DC and SL DC the same, so that frequently adjusting Radio Frequency (RF) or interference can be prevented during each switching from SL transmission to UL transmission or from the UL transmission to the SL transmission. In this case, when uplink transmission is performed, the terminal device 10 may not transmit the UL signal at the UL DC position (that is, also the SL DC position).

Specifically, the terminal device 10 may not map the UL signal to the UL DC or may set UL transmission power on the UL DC to 0, the UL signal mapped to the UL DC to 0, or the UL transmission power to 0 or to be lower than a predetermined value.

In another possible implementation, the terminal device 10 may not transmit the SL signal at the SL DC position (that is, also the UL DC position). Specifically, the terminal device 10 may not map the SL signal to the SL DC or may set the SL transmission power on the SL DC to 0, the SL signal mapped to the SL DC to 0, or the SL transmission power to 0 or to be lower than a predetermined value. Therefore, frequent RF adjustments can be prevented, and possible interference between the SL and UL can be reduced.

The method for determining a DC position according to the embodiments of the present disclosure has been described above with reference to FIG. 1 to FIG. 5. Next, a method for determining a DC position according to a further embodiment of the present disclosure will be described in detail with reference to FIG. 6. It may be understood that interaction between a network device and a terminal device described on a network device side is the same as that described on a terminal device side in the method shown in FIG. 1 to FIG. 5. To avoid repetition, relevant descriptions are appropriately omitted.

Figure 6:
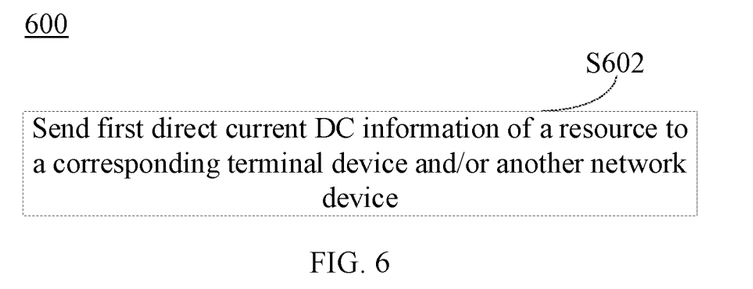
FIG. 6 is a schematic flow chart of a further embodiment for determining a DC position according to the present disclosure.

FIG. 6 is a schematic flow diagram for implementing a method for determining a DC position according to an embodiment of the present disclosure, which may be applied to a network device 40. As shown in FIG. 6, the method 600 includes the following step.

S602: Send first direct current DC information to a corresponding terminal device and/or another network device.

The first direct current DC information is sent to a corresponding terminal device 10 and/or another network device 50. The DC information is used to determine a first direct current DC position, and the first direct current DC position is determined by the terminal device 10 and/or another network device 50 according to the first DC information.

The network device 30 in the embodiments of FIG. 1 to FIG. 5, and the network device 40 and the another network device 50 in this embodiment may be the same network device in some implementations and may be different network devices in some other implementations.

For the terminal device 10 and/or the another network device 50, in this step, a manner of obtaining the DC information is through an indication of the network device 40. The DC position can be determined by the terminal device 10 and/or the another network device 50 according to the DC information and corresponding processing is performed to prevent a signal transmission error.

Therefore, through this embodiment of the present disclosure, the DC position can be determined, so as to prevent a signal transmission error and ensure transmission performance.

In an implementation, the first DC information includes at least one of position information and an offset value relative to a reference position. The first DC position is the reference position or a position obtained by shifting according to the offset value relative to the reference position. The reference position includes: at least one of a SSB position, a S-SSB position, a preset point in a sidelink, a preset point in a Uu link, uplink DC, downlink DC, sidelink DC, a reference carrier position, a reference bwp position, a reference resource pool position, a reference sub-carrier position, a reference sub-channel position, a reference resource grid position, or a reference resource block position.

In another implementation, the first DC information is used to represent that the first DC position is in at least one of a center, a start point, an end point, or outside of a range of a resource.

A specific implementation may be similar to that described in the embodiment of FIG. 2, and will not be described herein again.

In an implementation, for the same resource, the first DC information is the same as second DC information obtained by the terminal device and/or the another network device in at least one of other obtaining manners; and/or, for the same resource, the first DC position is the same as a second DC position. The other obtaining manners include: at least one of an indication from the another network device or the another terminal device, pre-configuration in the terminal device, or a definition of a preset rule. A specific implementation may be similar to that described in the embodiment of FIG. 3, and will not be described herein again.

Therefore, according to the method for determining a DC position according to this embodiment of the present disclosure, DC information may be indicated by the network device, so that transmission performance can be ensured.

In an implementation, the network device 40 may mutually notify or negotiate DC information of one or more carriers, resource grids, bwp, or resource pools with the another network device, for example, at least one of an Xn interface, an F1 interface, an X2 interface, an N2 interface, or an S1 interface of base stations is used for notification or negotiation between the base stations. For another example, the base station may configure DC information to a UE through at least one of a PBCH, a System Information Block (SIB), RLC layer signaling, PDCP layer signaling, MAC layer signaling, or another piece of RRC signaling.

There may be one or more pieces of DC information in this step, and content included in the DC information may be similar to that in the embodiment of FIG. 2, which will not be described herein again. The another network device refers to a network device different from the network device 40, including but not limited to the network device 30 and network device 50.

Figure 7:
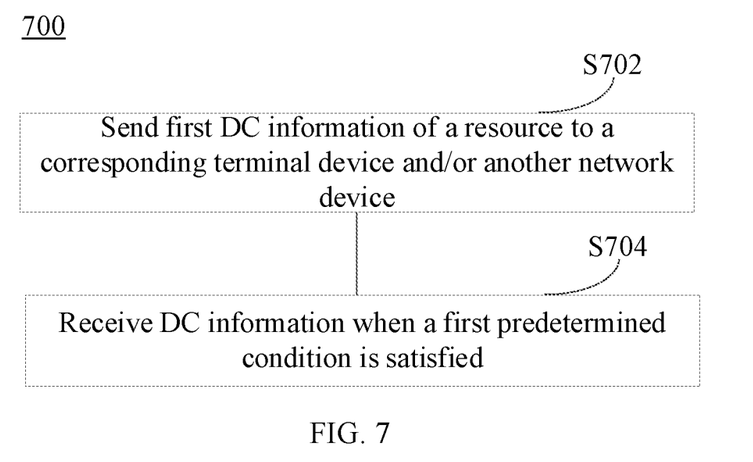
FIG. 7 is a schematic flow chart of a still further embodiment for determining a DC position according to the present disclosure.

FIG. 7 is a schematic flow diagram of another embodiment of the method for determining a DC position according to the present disclosure, which can be applied to a network device 40. As shown in FIG. 7, the method 700 includes the following step.

S702: Send first direct current DC information to a corresponding terminal device and/or another network device.

The first direct current DC information is sent to a corresponding terminal device 10 and/or another network device 50, so that the terminal device 10 and/or another network device 50 can determine a first direct current DC position according to the first DC information.

The network device 30 in the embodiments of FIG. 1 to FIG. 5, and the network device 40 and another network device 50 in this embodiment may be the same network device in some implementations and may be different network devices in some other implementations.

For the terminal device 10 and/or another network device 50, in this step, a manner of obtaining the DC information is through an indication of the network device 40. The DC position can be determined by the terminal device 10 and/or another network device 50 according to the DC information and corresponding processing is performed to prevent a signal transmission error.

S704: Receive DC information when a first predetermined condition is satisfied.

When the first predetermined condition is satisfied, the network device 40 may receive DC information sent by the terminal device 10, a terminal device 20, or another terminal device, the network device 30, the network device 50, or another network device. The DC information may be called fifth DC information, and the fifth DC information may be the same as or different from the first DC information.

The first predetermined condition includes at least one of the following: reporting DC position is required; resource reconfiguration occurs; bwp switching occurs; resource pool switching occurs; a beam failure; a radio link failure; beam failure recovery; or radio link failure recovery.

The first predetermined condition and content of received DC information may be specifically similar to corresponding description in the embodiment of FIG. 4, and will not be described herein again.

The network device 40 may perform corresponding processing based on the received fifth DC information. For example, the fifth DC information may be sent to the terminal device, an uplink signal may be received based on the fifth DC information, and the like.

Therefore, through this embodiment of the present disclosure, the DC position can be determined, so as to prevent a signal transmission error and ensure transmission performance.

Figure 8:
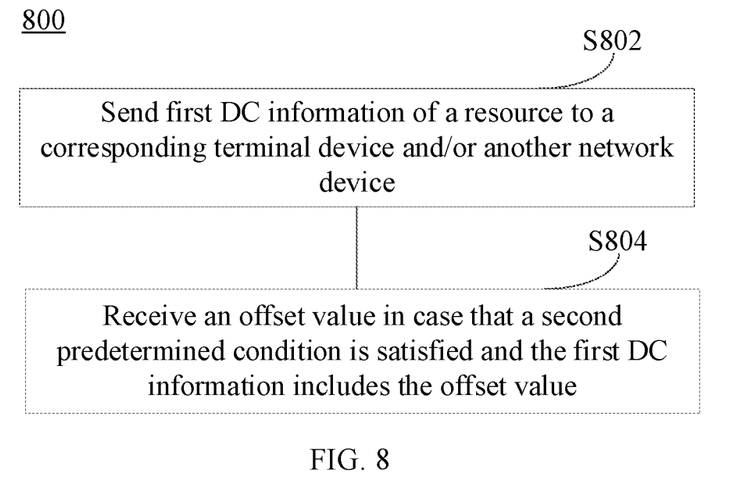
FIG. 8 is a schematic flow chart of a yet further embodiment for determining a DC position according to the present disclosure.

FIG. 8 is a schematic flow diagram of a yet further embodiment of the method for determining a DC position according to the present disclosure, which can be applied to the network device 40. As shown in FIG. 8, the method 800 includes the following step.

S802: Send first direct current DC information to a corresponding terminal device and/or another network device.

The first direct current DC information is sent to a corresponding terminal device 10 and/or another network device 50, so that the terminal device 10 and/or another network device 50 can determine a first direct current DC position according to the first DC information.

The network device 30 in the embodiments of FIG. 1 to FIG. 5, and the network device 40 and the another network device 50 in this embodiment may be the same network device in some implementations and may be different network devices in some other implementations.

For the terminal device 10 and/or the another network device 50, in this step, a manner of obtaining the DC information is through an indication of the network device 40. The DC position can be determined by the terminal device 10 and/or the another network device 50 according to the DC information and corresponding processing is performed to prevent a signal transmission error.

S804: Receive an offset value in case that a second predetermined condition is satisfied and the first DC information includes the offset value.

In case that the second predetermined condition is satisfied, the network device 40 may receive the offset value sent by the terminal device 10, a terminal device 20, or another terminal device, the network device 30, the network device 50, or another network device.

The second predetermined condition includes at least one of the following: a request for reporting the DC position is obtained; a request for reporting an offset is obtained; an offset is configured for a sidelink or an uplink; resource reconfiguration occurs; BWP switching occurs; resource pool switching occurs; a beam failure; a radio link failure; beam failure recovery; or radio link failure recovery. Details are similar to corresponding description in FIG. 5 and are not described herein again.

The network 40 may perform corresponding processing based on the received offset value. For example, the offset value may be sent to the terminal device, the DC position may be determined according to the offset value, an uplink signal may be received, and the like.

Therefore, through this embodiment of the present disclosure, the DC position can be determined, so as to prevent a signal transmission error and ensure transmission performance.

Figure 9:
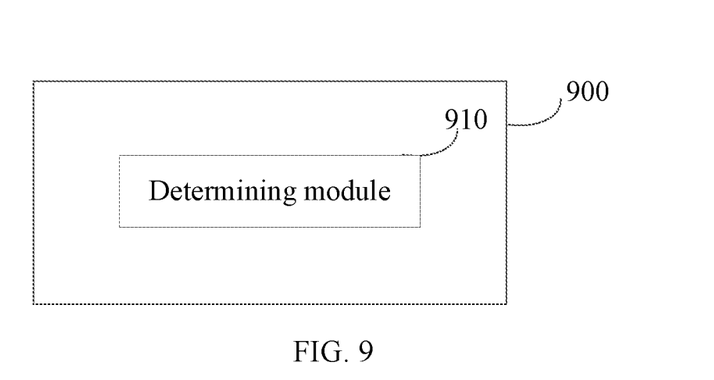
FIG. 9 is a schematic structural diagram of an embodiment of a terminal device according to the present disclosure.

FIG. 9 is a schematic structural diagram of an embodiment of a terminal device according to the present disclosure. As shown in FIG. 9, a terminal device 900 includes a determining module 910.

The determining module 910 is configured to obtain direct current DC information, where the DC information is used to determine a direct current DC position.

In some implementations, the DC information is obtained in at least one of the following obtaining manners, including: an indication from a network device or another terminal device, pre-configuration in the terminal device, or a definition of a preset rule.

In some implementations, at least two pieces of DC information obtained for the same resource are the same; and/or, for the same resource, DC positions determined according to the at least two pieces of DC information are the same.

In some implementations, the DC information includes: at least one of position information and an offset value. The position information is used to indicate a reference position, and the offset value is an offset value relative to the reference position.

In some implementations, the DC position is the reference position or a position obtained by shifting according to the offset value relative to the reference position.

In some implementations, the reference position includes: at least one of an SSB position, an S-SSB position, a preset point in a sidelink, a preset point in a Uu link, uplink DC, downlink DC, sidelink DC, a reference carrier position, a reference bwp position, a reference resource pool position, a reference sub-carrier position, a reference sub-channel position, a reference resource grid position, or a reference resource block position.

In some implementations, the DC information is used to represent that the DC position is in at least one of a center, a start point, an end point, or outside of a range of a resource.

In some implementations, the determining module 910 is configured to send, in case that a first predetermined condition is satisfied, the DC information after the direct current DC information is obtained. The first predetermined condition includes at least one of the following: a request for reporting the DC position is obtained; resource reconfiguration occurs; bwp switching occurs; resource pool switching occurs; a beam failure; a radio link failure; beam failure recovery; or radio link failure recovery.

In some implementations, the determining module 910 is configured to send, in case that a second predetermined condition is satisfied and the DC information includes an offset value, the offset value after the direct current DC information is obtained. The second predetermined condition includes at least one of the following: a request for reporting the DC position is obtained; a request for reporting an offset is obtained; an offset is configured for a sidelink or an uplink; resource reconfiguration occurs; bwp switching occurs; resource pool switching occurs; a beam failure; a radio link failure; beam failure recovery; or radio link failure recovery.

In some implementations, the determining module 910 is configured, after determining the direct current DC position, not to transmit a signal or to transmit a signal at a low power at the DC position.

The terminal device 900 according to this embodiment of the present disclosure may be referenced to the flows corresponding to the methods 100 to 500 according to the embodiments of the present disclosure. Furthermore, each unit/module in the terminal device 900 and the foregoing other operations and/or functions are used to implement corresponding flows of the methods 100 to 500, and the same or equivalent technical effect can be achieved. For brevity, details are not described herein again.

Figure 10:
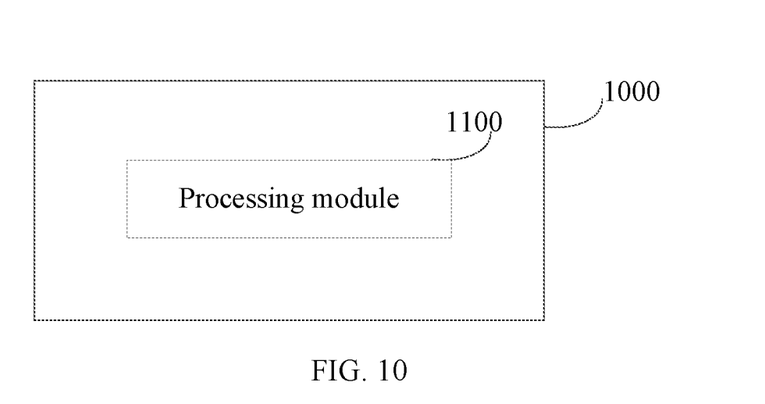
FIG. 10 is a schematic structural diagram of an embodiment of a network device according to the present disclosure.

FIG. 10 is a schematic structural diagram of an embodiment of a network device according to the present disclosure. As shown in FIG. 10, a network device 1000 includes a processing module 1100.

The processing module 1100 is configured to send first direct current DC information to a corresponding terminal device and/or another network device, so that the terminal device and/or the another network device can determine a first direct current DC position according to the first DC information.

In some implementations, for the same resource, the first DC information is the same as second DC information obtained by the terminal device and/or the another network device in at least one of other obtaining manners; and/or, for the same resource, the first DC position is the same as a second DC position. The other obtaining manners include: at least one of an indication from the another network device or the another terminal device, pre-configuration in the terminal device, or a definition of a preset rule.

In some implementations, the first DC information includes: at least one of position information and an offset value. The position information is used to indicate a reference position, and the offset value is an offset value relative to a reference position.

In some implementations, the DC position is the reference position or a position obtained by shifting according to the offset value relative to the reference position.

In some implementations, the reference position includes: at least one of an SSB position, an S-SSB position, a preset point in a sidelink, a preset point in a Uu link, uplink DC, downlink DC, sidelink DC, a reference carrier position, a reference bwp position, a reference resource pool position, a reference sub-carrier position, a reference sub-channel position, a reference resource grid position, or a reference resource block position.

In some implementations, the first DC information is used to represent that the DC position is in at least one of a center, a start point, an end point, or outside of a range of a resource.

In some implementations, the processing module 1100 is configured to receive, in case that a first predetermined condition is satisfied, the DC information after the first direct current DC information is sent to a corresponding terminal device and/or another network device. The first predetermined condition includes at least one of the following: a request for reporting the DC position is obtained; resource reconfiguration occurs; bwp switching occurs; resource pool switching occurs; a beam failure; a radio link failure; beam failure recovery; or radio link failure recovery.

In some implementations, the processing module 1100 is configured to receive, in case that a second predetermined condition is satisfied and the first DC information includes an offset value, the offset value after the first direct current DC information is sent to a corresponding terminal device and/or another network device. The second predetermined condition includes at least one of the following: a request for reporting the DC position is obtained; a request for reporting an offset is obtained; an offset is configured for a sidelink or an uplink; resource reconfiguration occurs; bwp switching occurs; resource pool switching occurs; a beam failure; a radio link failure; beam failure recovery; or radio link failure recovery.

The network device 1000 according to this embodiment of the present disclosure may be referenced to the flows corresponding to the methods 600 to 800 according to the embodiments of the present disclosure. Furthermore, each unit/module in the network device 1000 and the foregoing other operations and/or functions are used to implement corresponding flows of the methods 600 to 800, and the same or equivalent technical effect can be achieved. For brevity, details are not described herein again.

Figure 11:
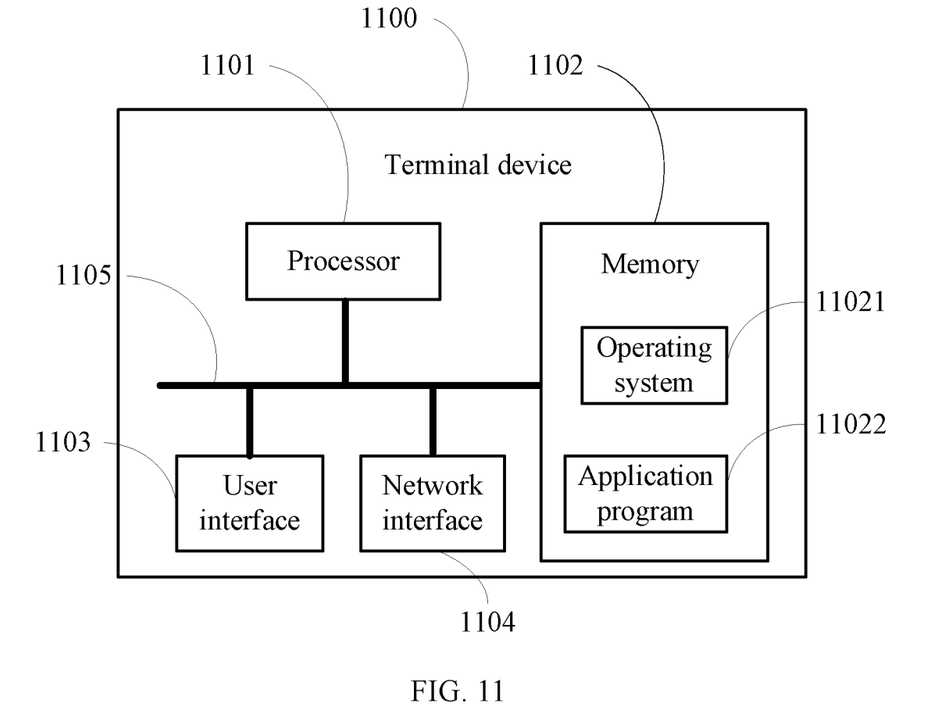
FIG. 11 is a schematic structural diagram of another embodiment of the terminal device according to the present disclosure.

FIG. 11 is a schematic structural diagram of another embodiment of the terminal device according to the present disclosure. As shown in FIG. 11, the terminal device 1100 includes: at least one processor 1101, a memory 1102, at least one network interface 1104, and a user interface 1103. All components of the terminal device 1100 are coupled together by using a bus system 1105. It can be understood that the bus system 1105 is configured to implement a connection and communication between these components. In addition to a data bus, the bus system 1105 further includes a power bus, a control bus, and a status signal bus. However, for clear description, various buses are marked as the bus system 1105 in FIG. 11.

The user interface 1103 may include a display, a keyboard, a clicking device (for example, a mouse or a trackball), a touch panel, a touchscreen, or the like.

It can be understood that the memory 1102 in this embodiment of the present disclosure may be a volatile memory or a non-volatile memory, or may include both a volatile memory and a non-volatile memory. The nonvolatile memory may be a Read-only Memory (ROM), a Programmable ROM (PROM), an Erasable PROM (EPROM), an Electrically EPROM (EEPROM), or a flash memory. The volatile memory may be a Random Access Memory (RAM), which is used as an external cache. Through example but not limitative description, many forms of RAMs may be used, for example, a Static RA, (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memory 1102 in the system and the method that are described in the embodiments of the present disclosure is intended to include but is not limited to these and any other suitable types of memories.

In some implementations, the memory 1102 stores the following elements: an executable module or a data structure, a subset thereof, or an extended set thereof: an operating system 11021 and an application program 11022.

The operating system 11021 includes various system programs, such as a framework layer, a core library layer, a driver layer, and is configured to implement various basic services and process hardware-based tasks. The application program 11022 includes various application programs, for example, a media player and a browser, and is configured to implement various application services. A program for implementing the method in this embodiment of the present disclosure may be included in the application program 11022.

In this embodiment of the present disclosure, the terminal device 1100 further includes a computer program that is stored in the memory 1102 and that can be run on the processor 1101, and when the computer program is executed by the processor 1101, the steps of the methods 100 to 500 are implemented.

The method disclosed in the foregoing embodiment of the present disclosure may be applied to the processor 1101, or implemented by the processor 1101. The processor 1101 may be an integrated circuit chip having a signal processing capability. During implementation, each step of the foregoing method may be completed by using an integrated logic circuit of hardware or an instruction in a form of software in the processor 1101. The processor 1101 may be a general purpose processor, a Digital Signal Processor (DSP), an Application Specific Integrated Circuit (ASIC), a Field Programmable Gate Array (FPGA), another programmable logic device, a discrete gate, a transistor logic device, or a discrete hardware component. The processor may implement or perform the methods, the steps, and logical block diagrams that are disclosed in the embodiments of the present disclosure. The general purpose processor may be a microprocessor or may be any conventional processor or the like. Steps of the methods disclosed with reference to the embodiments of the present disclosure may be directly executed and accomplished through a hardware decoding processor, or may be executed and accomplished by using a combination of hardware and software modules in the decoding processor. The software module may be located in a computer-readable storage medium that is known this field, such as a random access memory, a flash memory, a read-only memory, a programmable read-only memory, an electrically erasable programmable memory, a register, or the like. The computer-readable storage medium is located in the memory 1102, and the processor 1101 reads information from the memory 1102 and completes the steps of the foregoing method in combination with hardware of the processor. Specifically, the computer readable storage medium stores a computer program, and when the computer program is executed by the processor 1101, the steps of the foregoing embodiments of methods 100 to 500 are implemented.

It can be understood that the embodiments described in the present disclosure may be implemented by hardware, software, firmware, middleware, microcode, or a combination thereof. For implementation with hardware, a processing unit can be implemented in one or more Application Specific Integrated Circuits (ASIC), Digital Signal Processing (DSP), DSP Device (DSPD), Programmable Logic Device (PLD), Field-Programmable Gate Array (FPGA), general processors, controllers, micro-controllers, microprocessors, and another electronic unit for implementing the functions of this application, or their combinations.

For implementation with software, technologies described in the embodiments of the present disclosure may be implemented by using a module (for example, a process or a function) that performs the function in the embodiments of the present disclosure. A software code may be stored in a memory and executed by a processor. The memory may be implemented inside or outside the processor.

The terminal device 1100 can implement each process implemented by the terminal device in the foregoing embodiments, and can achieve the same or equivalent technical effect. To avoid repetition, details are not described herein again.

Figure 12:
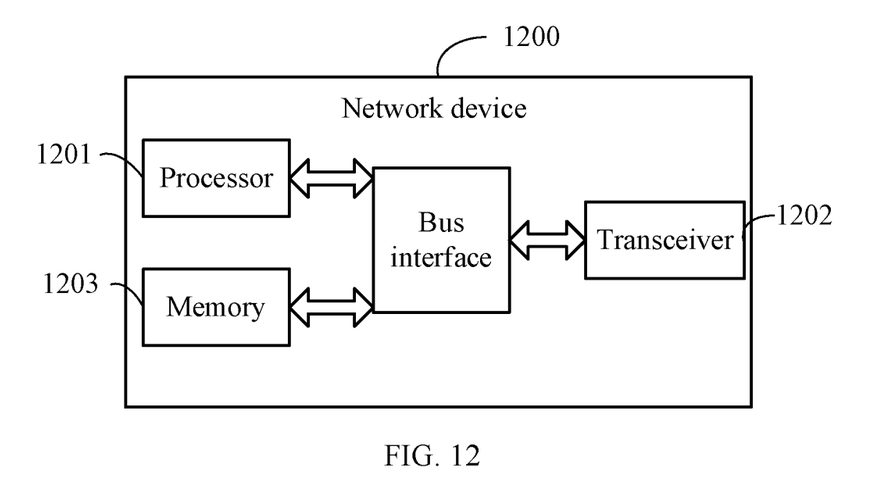
FIG. 12 is a schematic structural diagram of another embodiment of the network device according to the present disclosure.

Referring to FIG. 12, FIG. 12 is a schematic structural diagram of another embodiment of a network device according to the present disclosure, which can implement details of method embodiments 600 to 800 and achieve the same effect. As shown in FIG. 12, a network device 1200 includes a processor 1201, a transceiver 1202, a memory 1203, and a bus interface. In this embodiment of the present disclosure, the network device 1200 may further include a computer program that is stored in the memory 1203 and that can be run on the processor 1201. When the computer program is executed by the processor 1201, the steps of the methods 600 to 800 are implemented.

In FIG. 12, a bus architecture may include any number of interconnected buses and bridges. Specifically, various circuits of one or more processors represented by the processor 1201 and a memory represented by the memory 1203 are interconnected. The bus architecture may further link other various circuits such as a peripheral device, a voltage stabilizer, and a power management circuit. These are well known in the art, and therefore are not further described in this specification. The bus interface provides an interface. The transceiver 1202 may be a plurality of elements, that is, include a transmitter and a receiver, and provide a unit for communicating with other various apparatuses on a transmission medium.

The processor 1201 is responsible for bus architecture management and general processing. The memory 1203 may store data used by the processor 1201 when the processor performs an operation.

An embodiment of the present disclosure further provides a computer-readable storage medium. The computer-readable storage medium stores a computer program, and when a processor executes the computer program, the processes of the foregoing method embodiments 100 to 500 or embodiments 600 to 800 are implemented and the same technical effect can be achieved. To avoid repetition, details are not described herein again. For example, the computer-readable storage medium includes a non-transitory computer-readable storage medium, such as a Read-Only Memory (ROM), a Random Access Memory (RAM), a magnetic disk, an optical disc, or the like.

It should be noted that in this specification, the terms "include", "contain" and any other variants thereof are intended to cover non-exclusive inclusion, so that a process, a method, an article, or an apparatus that includes a series of elements not only includes these elements, but may also include other elements not expressly listed, or also include elements inherent to this process, method, article, or apparatus. Without more restrictions, an element defined by the statement "including a . . . " does not exclude another same element in this process, method, article, or apparatus that includes the element.

Based on the foregoing descriptions of the embodiments, a person skilled in the art may clearly understand that the method in the foregoing embodiment may be implemented by software plus a necessary universal hardware platform or by hardware only. In most circumstances, the former is a preferred implementation. Based on such understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations, and the foregoing specific implementations are only illustrative and not restrictive. Under the enlightenment of the present disclosure, a person of ordinary skill in the art can make many forms without departing from the purpose of the present disclosure and the protection scope of the claims, and all of these fall within the protection of the present disclosure.

What is claimed is:

1. A method for determining a first direct current (DC) position, performed by a terminal device, comprising:
    obtaining DC information, wherein the DC information comprises a specific value indicating that a Sidelink (SL) DC position is outside a reference carrier, or another specific value indicating that the SL DC position is undetermined; and
    determining the first DC position according to the DC information,
    wherein at least two pieces of the DC information are obtained with respect to a same resource and are the same, and DC positions determined according to the at least two pieces of the DC information with respect to the same resource are the same first DC position,
    wherein after obtaining the DC information, the method further comprises:
        skipping performing a signal transmission at the first DC position; or
        performing a signal transmission at a low power at the first DC position.

2. The method according to claim 1, wherein the DC information is obtained in at least one of the following obtaining manners comprising: an indication from a network device or another terminal device, pre-configuration in the terminal device, or a definition of a preset rule.

3. The method according to claim 1, wherein the same resource comprises: at least one of a carrier, a bandwidth part (BWP), a resource pool, a sub-carrier, a sub-channel, a resource grid, or a resource block (RB); and
    the first DC position comprises: a DC transmitting position and a DC receiving position.

4. The method according to claim 1, wherein the DC information comprises: at least one of a reference carrier number, a reference BWP number, a reference resource pool number, a reference sub-carrier number, a reference sub-channel number, a reference resource grid number, a reference resource block number, a preset point number, or a frequency number.

5. The method according to claim 1, wherein the DC information comprises: at least one of position information and an offset value, wherein the position information is used to indicate a reference position, and the offset value is an offset value relative to the reference position.

6. The method according to claim 5, wherein the first DC position is the reference position or a position obtained by shifting according to the offset value relative to the reference position; or
    the reference position comprises: at least one of a physical broadcast channel Synchronization Signal Block (SSB) position, a sidelink physical broadcast channel SSB (S-SSB) position, a preset point in a sidelink, a preset point in a Uu link, uplink DC, downlink DC, sidelink DC, a reference carrier position, a reference BWP position, a reference resource pool position, a reference sub-carrier position, a reference sub-channel position, a reference resource grid position, or a reference resource block position.

7. The method according to claim 1, wherein the DC information is used to represent at least one of the following: that the first DC position is at a center, a start point, an end point, or outside of the range of a resource, or that the first DC position is undetermined.

8. The method according to claim 7, wherein the DC information comprises a preset value, and the preset value is used to represent at least one of the following: that the first DC position is at the center, the start point, the end point, or the outside of the range of a resource, or that the first DC position is undetermined.

9. A mobile terminal, comprising: a memory storing a computer program; and a processor coupled to the memory and configured to execute the computer program to perform a method for determining a first direct current (DC) position, the method comprising:
    obtaining DC information, wherein the DC information comprises a specific value indicating that a Sidelink (SL) DC position is outside a reference carrier, or another specific value indicating that the SL DC position is undetermined; and
    determining the first DC position according to the DC information,
    wherein at least two pieces of the DC information are obtained with respect to a same resource and are the same, and DC positions determined according to the at least two pieces of the DC information with respect to the same resource are the same first DC position,
    wherein after obtaining the DC information, the method further comprises:
        skipping performing a signal transmission at the first DC position; or
        performing a signal transmission at a low power at the first DC position.

10. The mobile terminal according to claim 9, wherein the DC information is obtained in at least one of the following obtaining manners comprising: an indication from a network device or another terminal device, pre-configuration in a terminal device, or a definition of a preset rule.

11. The mobile terminal according to claim 9, wherein the same resource comprises: at least one of a carrier, a bandwidth part (BWP), a resource pool, a sub-carrier, a sub-channel, a resource grid, or a resource block (RB); and the first DC position comprises: a DC transmitting position and a DC receiving position.

12. The mobile terminal according to claim 9, wherein the DC information comprises: at least one of a reference carrier number, a reference BWP number, a reference resource pool number, a reference sub-carrier number, a reference sub-channel number, a reference resource grid number, a reference resource block number, a preset point number, or a frequency number.

13. The mobile terminal according to claim 9, wherein the DC information comprises: at least one of position information and an offset value, wherein the position information is used to indicate a reference position, and the offset value is an offset value relative to the reference position.

14. The mobile terminal according to claim 13, wherein the first DC position is the reference position or a position obtained by shifting according to the offset value relative to the reference position; or the reference position comprises: at least one of a physical broadcast channel Synchronization Signal Block (SSB) position, a sidelink physical broadcast channel SSB (S-SSB) position, a preset point in a sidelink, a preset point in a Uu link, uplink DC, downlink DC, sidelink DC, a reference carrier position, a reference BWP position, a reference resource pool position, a reference sub-carrier position, a reference sub-channel position, a reference resource grid position, or a reference resource block position.

15. The mobile terminal according to claim 9, wherein the DC information is used to represent at least one of the following: that the first DC position is at a center, a start point, an end point, or outside of a range of a resource, or that the first DC position is undetermined.

16. The mobile terminal according to claim 15, wherein the DC information comprises a preset value, and the preset value is used to represent at least one of the following: that the first DC position is at the center, the start point, the end point, or the outside of the range of a resource, or that the first DC position is undetermined.

* * * * *